3,698,933
COATED RESILIENT MATTING AND METHOD FOR MAKING
Robert Ernest Leeks, Reading, and Alfred John Demers, Peabody, Mass., assignors to The Borden Company, New York, N.Y.
Original application Nov. 25, 1966, Ser. No. 597,059, now Patent No. 3,562,193, dated Feb. 9, 1971. Divided and this application Mar. 31, 1970, Ser. No. 30,617
Int. Cl. B44d 1/14; C08d 9/04
U.S. Cl. 117—72
4 Claims

ABSTRACT OF THE DISCLOSURE

This invention relates to the method and composition produced by the steps of admixing a liquid binder of a polymer latex, elastomeric when cured, and an emulsified highly aromatic oil which is compatible with said polymer latex, combining with said binder, cured elastomeric aggregates having an average particle size less than about one inch in its greatest dimension and a curing agent for said polymer latex, applying the liquid binder and aggregates onto a surface, curing the coating, then coating the surface with a sealer being a polymer latex which is elastomeric when cured. The final cured composite is used as a covering layer on a resilent running track used in sporting events.

---

Figure 1:
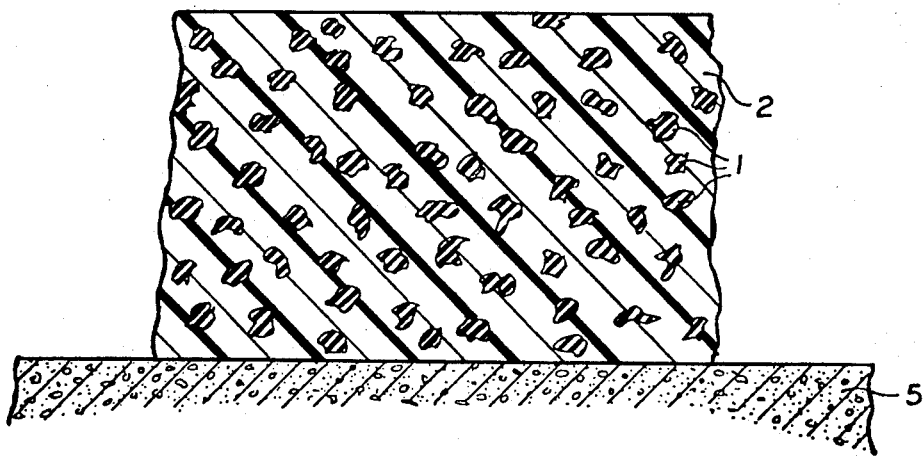

This application is a division of Ser. No. 597,059, filed Nov. 25, 1966, now U.S. Pat. 3,562,193.

This invention relates to resilient matting. More specifically the invention relates to resilient matting containing discrete elastomeric aggregates and binder therefor. The matting in the cured condition, is characterized as firm under foot but with sufficient resiliency to elastically yield under compression and return to its original shape when the compressive load is removed.

Heretofore, surface coatings have been prepared by admixing elastomeric latexes with solid aggergates which on curing resulted in hard surfaces not suitable for use as resilient matting materials. Attempts to reduce hardness of known materials by increasing the content of rubber scraps with a corresponding reduction in the mineral content of the aggregate portion or by the use of aliphatic petroleum oils have had only limited success. Reduction of the mineral content critically affected the resilient properties of the product in that while decreasing hardness was noted, corresponding decrease in elasticity was observed so that permanent deformation under compressive loading resulted.

The present invention provides a tough resilient matting which retains its shape in cured condition, yields under compression loading, and returns to its original shape after the load has been removed.

Briefly stated, the present invention includes a resilient mating which comprises discrete elastomeric aggregates, for example, vulcanized rubber scraps and a binder derived from an elastomeric polymer latex and a compounding agent which is a highly aromatic hydrocarbon concentrate of the kind described hereinafter. The invention also comprises the method of making the resilient matting.

As to materials, the aggregates are discrete particles of elastomeric material in the cured or vulcanized state. The average particle size of the aggregates should be relatively small and the most desirable properties of the resilient matting are obtained when these aggregate particles are less than about one inch in their greatest dimension and preferably for best results, in the range of about .20–.01 inch. Larger aggregate particles tend to produce a mixture of poor workability and rough, open texture which tends to weaken the structural strength of the article. On the other hand, average aggregate particles sized substantially below .01 inch in their greatest dimension have the effect of reducing the elastic response of the system resulting in excessively slow recovery from deformation.

The elastomeric aggregate particles are preferably vulcanized rubber scrap, such as rubber buffings, foam rubber scrap, etc., because of the economic advantages of using such materials. The various aggregate rubber components can be either natural or synthetic rubbers, examples of which are natural hevea, gutta percha, polymerized 2-chlorobutadiene, butyl rubber which is a copolymer of isobutylene and a $C_4$–$C_{14}$ multiolefin such as an isoprene, chlorinated butyl rubber, dienenitrile rubber, SBR which is a series of copolymers of about 75% by weight of butadiene and 25% by weight of styrene, polyisobutylene, polybutadiene, polyisoprene, ethylene-propylene copolymers, polyesters, polysilicones, polysulphide rubber, etc. The listed materials must have elastomeric or resilient properties in the cured or vulcanized form. Generally SBR or natural rubber have been found to give excellent results.

The binder is comprised of two components, one of which is a polymeric latex characterized as being elastomeric when cured. Examples of the polymers include butyl rubber, ethylene-propylene copolymers, chloroprene, polyisoprene, polybutadiene, butadiene-nitrile copolymers, styrene-butadiene rubber, graft polymers of natural rubber and polymers of acrylic type esters such as methyl acrylate and methyl methacrylate, and the like.

The other necessary component of the binder is a highly aromatic oil compounding agent which preferably has high compatibility with the elastomeric latex and the elastomeric aggregates. By "compatible" in the case of the aggregates we means that it tends to cause swelling of these aggregates. Generally any of the highly aromatic concentrates can be used which are compatible with the latex polymer and also swell the aggregate particles, but a high viscosity material is best suited. Preferable are oils having a viscosity SSU/210° F. in excess of 100 seconds and gravity degrees API up to 12. An oil having an SSU/210° in excess of 2000 seconds has been found to be very suitable. The softening point of the concentrates should be in the range of about 110°–120° F. The aromatic content of the oil is extremely high (preferably over 50%) although naphthenic carbon atoms and paraffinic carbon atoms may be present to limited degrees in the resin. The oil may contain up to about 4% asphaltenes, but these are not necessary, and in fact, best results are obtained when asphaltenes are not present in the oil. It is considered that asphaltenes detract from the desired properties of the resilient matting, however commercially available aromatic oils as described may contain proportions of asphaltenes up to 4%. Also present in the oils are polar compounds in proportion of up to about 35% by weight which polar compounds may comprise heterocyclic molecules containing one or more atoms of oxygen, nitrogen, or sulfur per molecule.

The oil is generally derived as a by-product of the refining of low paraffin crude oils. This is removed by extraction from a vacuum distilled fraction leaving the purified lubricating oil of the crude. The oils described are available under such names as "Sundex," "Califlux," "Mobilsol," "Dutrex," etc., with various numbers to define the various available fractions of the aromatic oil.

When the matting is made, the binder and the aggregates are admixed together and applied onto dry substrate surfaces which the resilient matting is to cover. Conveniently, the admixture is coating onto the substrate surface by any of the conventional methods for the installation of pavement compounds and can be made to have a smooth or irregularly textured surface. In test installations, it has been found that thicknesses not exceeding about 1 inch are preferable in order to maintain the best degree of resiliency.

Curing agents and/or organic accelerators for the polymer are included in the binder at time the matting is prepared. These include acid salts (where an aqueous solution thereof produces a pH below 7) and oxides of multivalent metals and sulphur compounds as for example, zinc oxide, magnesium oxide, lead oxide, tetraethyl thiuram disulfide, and the like.

Other additives each providing the advantages known therefor may include stabilizers against oxidation and light which prohibit the oxidation and degradation of the elastomeric materials for example, phenyl beta naphthylamine, and alkylated bisphenol and other materials for this purpose. Color may be added to the system by including pigments and preferably in the binder portion. Also reinforcing mineral fibres and additional water for easier handling can be included to advantage at the time the binder is made.

The admixture of binder and aggregate is conveniently spread onto a dry foundation surface such as portland cent concrete, asphalt concrete, wood, and generally any material on which a resilient matting for use as a running track, playground, tennis court, putting greens, boxing arena, athletic field, walking track can be applied.

We have found that resilient matting after proper drying and curing gives best results when the layer is in the range of .2–.6 inch thick. Mattings less than about .1 inch have been found to be deficient in the active materials and therefore do not provide the desired resiliency required.

The exposed surface of the matting may be coated with a sealer of said binder in which there may be admixed finely ground particles of aggregate material described but which do not have to be the same material used in the body of the matting.

Figure 2:
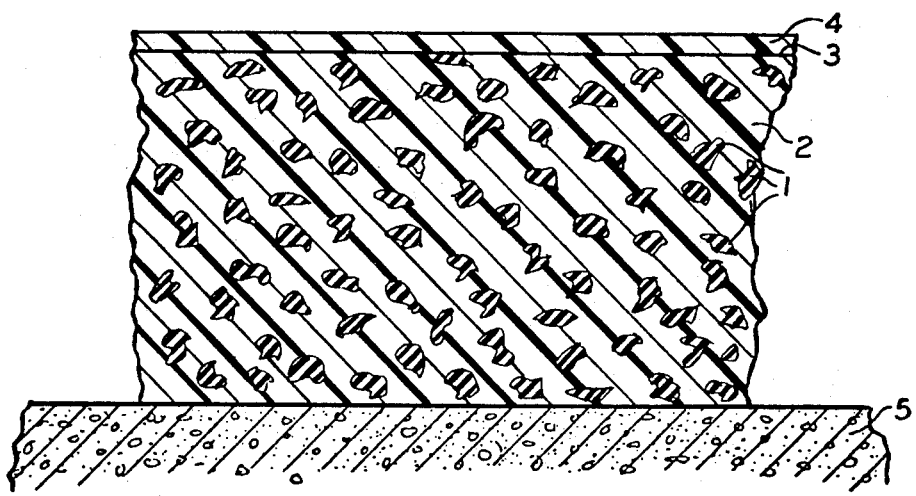

In the attached drawings FIG. 1 represents the resilient matting in broken cross-sectional view. FIG. 2 represents resilient matting in broken cross-sectional view together with an exposed surface coating. Both figures represent the resilient matting on a foundation surface.

Referring now to FIG. 1, it is readily seen that aggregates 1 are the discontinuous phase in binder 2. Numeral 5 represents a foundation surface on which the matting is applied. The exposed surface coating is best viewed in FIG. 2 wherein interface 3 separates the admixture of the resilient matting comprising aggregates 1 and binder 2 from surface coating 4.

As to proportions the following tables show proportional ranges of the components set forth in columns as Recommended which provide the optimum range of proportions for best results, and the Illustrative column which provides an expanded range in which the degree of efficiency of the invention is reduced. The proportion of materials of the resilient matting are shown in Table I.

TABLE I

|  | Parts by weight for 100 parts of aggregates | |
|---|---|---|
|  | Illustrative | Recommended |
| Aggregate | 100 | 100 |
| Liquid binder | 50–250 | 100–200 |

The proportion of materials in the binder are as shown in Table II.

TABLE II

|  | Parts by weight for 100 parts of oil | |
|---|---|---|
|  | Illustrative | Recommended |
| Aromatic oil | 100 | 100 |
| Elastomeric latex (solids) | 30–100 | 40–70 |

The latex is preferably an elastomeric dispersion in water which can be readily made by techniques well-known in the art or obtained commercially.

The highly aromatic oil emulsion is prepared by aqueous emulsification techniques well-known in the art of preparing asphalt-type soap emulsions. The emulsion is suitably post-stabilized and defoamed by addition of stabilizers and defoamers used in the industry.

This base emulsion is then further modified by admixture with the latex, pigments, fillers, etc. The emulsified admixture remains fluid over a period of at least 6 months.

Inert inorganic materials can be used to advantage in combination with the elastomeric aggregates to act as filler material. Up to about 50% by weight of the total aggregate proportion can be filler material. These fillers may include crushed stone, silica and sand, and other like mineral materials, and fibrous fillers such as asbestos. It is noted that the higher the proportion of these inert filler materials which are added to the matting composition, generally the harder or firmer is the resulting matting.

The invention will be further illustrated by description in connection with the following specific examples of the practice of it. Proportions are in parts by weight unless stated otherwise.

EXAMPLE I

Aromatic oil emulsion

| Material: | Parts by weight |
|---|---|
| Dutrex 998 [1] | 62.0 |
| Resin soap solution | 19.8 |
| Anionic stabilizer | 2.8 |
| Water | 15.4 |
|  | 100.0 |

[1] Dutrex 998 is a highly aromatic oil having a viscosity of 2,443 seconds SSU/210° F.; asphaltene content of 0 and aromatic content of 65.3%.

Pigment dispersion

| Material: | Parts by weight |
|---|---|
| 10% clay paste | 21.8 |
| Water | 30.4 |
| Pigment (iron oxide red) | 26.6 |
| Anionic stabilizer | 2.7 |
| Mineral filler | 18.5 |
|  | 100.0 |

Finished binder

| Material: | Parts by weight |
|---|---|
| Aromatic oil emulsion | 45.0 |
| Pigment dispersion | 25.3 |
| Elastomeric latex | 27.6 |
| Antioxidants | 1.1 |
| Curing agent (zinc oxide) | 1.0 |
|  | 100.0 |

The finished binder of Example I was admixed with scrap rubber aggregates and other components in the proportions shown below:

| Material: | Parts by weight |
|---|---|
| (A)— | |
| Liquid binder (55% solids) | 67.2 |
| 1/16 inch scrap rubber aggregate | 26.3 |
| Fine crushed stone | 6.5 |
|  | 100.0 |
| (B)— | |
| Liquid binder (55% solids) | 60.0 |
| 1/16 inch scrap rubber aggregate | 40.0 |
|  | 100.0 |
| (C)— | |
| Liquid binder (55% solids) | 50.0 |
| 1/16 inch scrap rubber aggregate | 38.0 |
| Fine tire buffings | 12.0 |
|  | 100.0 |

The admixtures were applied as mattings to dry surfaces of cement, wood, and crushed rock in dry thickness between 0.25 and 0.85 inch. Composition (B) was the softest and most resilient matting when the thickness was in the range of 0.4–0.6 inch. Composition (C) was more firm and composition (A) was the hardest. Also, below .1 inch in thickness, the compositions including composition (B) were found to be hard and above .75 inch in thickness they were found excessively soft.

EXAMPLE II

The mattings of Example I are made using, in turn, each of the other elastomeric polymeric latices described herein in substitution for the polychloroprene and in the proportions disclosed. Results similar to those of Example II are obtained.

EXAMPLE III

The mattings of Example I are made using, in turn, each of the other aromatic oils as described herein in substitution of the Dutrex and in the proportions disclosed. Where oil of lower viscosity is used, the matting tends to be weaker, excessively soft, and has lower elastic recovery. Where a high viscosity oil having aliphatic content of 50% and over is used, the resulting matting is excessively firm and deficient in toughness. Resiliency is substantially decreased with increasing aliphatic content.

EXAMPLE IV

The advantages of the aromatic oil compounding agent are shown in the following table of comparative elongation values for matting prepared as set forth in Example I, compared with matting prepared in the same manner, but utilizing an equal proportion of aliphatic oil substituted for the aromatic oil.

| Tensile load, lbs./sq. in. | Aliphatic, percent elongation | Aromatic, percent elongation |
|---|---|---|
| 33 | | 50 |
| 40 | 25 | |
| 67 | | 100 |
| 80 | 38 | |
| 100 | | 200 |
| 120 | 50 | |
| 133 | | 400 |
| 160 | 100 | |
| 167 | | 550 |
| 200 | ¹ 500 | 900 |
| 267 | | ¹ 3,500 |

¹ Maximum (break).

The greater the elasticity of the aromatic oil compound resulted in a substantially tougher material providing a superior product.

It will be understood that it is intended to cover all changes and modifications of the examples of the invention herein chosen for the purpose of illustration which do not constitute departures from the spirit and scope of the invention.

What is claimed is:

1. A method for making a coated resilient matting from a binder media and cured elastomeric aggregates, said matting characterized as firm under foot but with sufficient resiliency to yield elastically under compression and return to its original shape when the compressive load is removed, said method comprising the steps of:
   (1) admixing a liquid binder media consisting essentially of:
       (a) a polymer latex selected from the group consisting of butyl rubber, ethylene-propylene copolymers, polychloroprene, polyisoprene, polybutadiene, butadiene-nitrile copolymers, styrene-butadiene rubber, and polymers of acrylic esters; and
       (b) emulsified highly aromatic oil which is compatible with said polymer and aggregates;
   (2) combining with said binder:
       (a) cured elastomeric aggregates selected from the group consisting of natural and synthetic rubber immersed in said binder media to impart independent resilient suspension to said matting, said aggregates having an average particle size of 0.01 to 0.2 inch; and
       (b) curing agent for said polymer latex;
   (3) applying the liquid binder and elastomeric aggregates as a layer onto a foundation surface and permitting said layer to cure; and wherein said combination contains about 100 to 200 parts, by weight, of liquid binder for each 100 parts of aggregates and wherein the liquid binder consists essentially of 40 to 70 parts of elastomeric latex solids for 100 parts of said oil; and
   (4) coating said matting with a sealer, the sealer being a polymer latex which cures to an elastomer, mixed with a curing agent for said latex; and permitting said coating to cure.

2. The method of claim 1, wherein the liquid binder combined with the cured elastomeric aggregates contains about 100 to 200 parts, by weight, of liquid binder for each 100 parts of aggregates and wherein the liquid binder consists essentially of 40 to 70 parts of elastomeric latex solids for 100 parts of said oil.

3. The method of claim 1 wherein the sealer contains finely ground cured elastomeric particles.

4. A coated resilient matting produced by the method of claim 1.

References Cited

UNITED STATES PATENTS

| | | | |
|---|---|---|---|
| 2,457,097 | 12/1948 | Te Grotenhuis | 260—5 |
| 3,107,224 | 10/1963 | Rogers et al. | 260—29.7 GP |
| 3,083,124 | 3/1963 | Rahmes | 117—163 |
| 2,173,244 | 9/1939 | Young | 117—163 |

RALPH HUSACK, Primary Examiner

U.S. Cl. X.R.

117—77, 123 D, 148, 161 UD, UH; 260—4, 5, 29.7 GP, 41 C